(12) United States Patent
Gesret et al.

(10) Patent No.: US 6,980,587 B2
(45) Date of Patent: Dec. 27, 2005

(54) METHOD FOR ACQUISITION OF SLOT TIMING IN A DIRECT SEQUENCE SPREAD SPECTRUM COMMUNICATION RECEIVER

(75) Inventors: Anne-Marie Gesret, Berkshire (GB); Majid Boloorian, Berkshire (GB)

(73) Assignee: NEC Corporation, Tokyo (JP)

( * ) Notice: Subject to any disclaimer, the term of this patent is extended or adjusted under 35 U.S.C. 154(b) by 661 days.

(21) Appl. No.: 09/801,697

(22) Filed: Mar. 9, 2001

(65) Prior Publication Data

US 2001/0030995 A1 Oct. 18, 2001

(30) Foreign Application Priority Data

Mar. 14, 2000 (GB) .................................... 0006191

(51) Int. Cl.[7] .............................................. H04B 1/69
(52) U.S. Cl. ...................... 375/150; 375/147; 375/130; 382/278; 382/164; 370/324; 342/357.1
(58) Field of Search ................................. 375/150, 147, 375/130; 382/164, 278; 342/357.1; 370/324

(56) References Cited

U.S. PATENT DOCUMENTS

| | | | | |
|---|---|---|---|---|
| 5,495,428 A | * | 2/1996 | Schwartz | 382/164 |
| 5,982,809 A | * | 11/1999 | Liu et al. | 375/147 |
| 6,005,985 A | * | 12/1999 | Brison et al. | 382/278 |
| 6,252,544 B1 | * | 6/2001 | Hoffberg | 342/357.1 |
| 6,263,009 B1 | * | 7/2001 | Ramberg et al. | 375/130 |
| 6,459,724 B1 | * | 10/2002 | Yoneyama | 375/150 |
| 6,690,658 B1 | * | 2/2004 | Klank | 370/324 |

FOREIGN PATENT DOCUMENTS

EP 0 942 543 A2 9/1999

* cited by examiner

Primary Examiner—Stephen Chin
Assistant Examiner—Sudhanshu C. Pathak
(74) Attorney, Agent, or Firm—Sughrue Mion, PLLC

(57) ABSTRACT

A set of values corresponding to measured parameters of the output peaks resulting from the correlation of the received data with a synchronization code stored in the receiver are saved to a peak buffer. Subsequent transmissions of the synchronization data are similarly correlated in the receiver and the results stored as assigned values in further peak buffers. The contents of the peak buffers are then regrouped according to their positional entries. A ranking is computed from the values assigned for each position and the positions with the highest ranking are selected for slot timing.

19 Claims, 5 Drawing Sheets

|  | Largest peak (order, power, position) | Second largest peak (order, power, position) | Third largest peak (order, power, position) |
|---|---|---|---|
| First slot peak buffer | (3, 10.0, 2) | (2, 8.0, 100) | (1, 5.0, 20) |
| Second slot peak buffer | (3, 20.0, 2) | (2, 12.0, 50) | (1, 7.0, 100) |
| Third slot peak buffer | (3, 15.0, 10) | (2, 10.0, 2) | (1, 9.0, 50) |

FIG. 4

|  | (order, power) information | $M = \Sigma$ (power × order) |
|---|---|---|
| Position 2 | (3, 10.0), (3, 20.0), (2, 10.0) | 110.0 |
| Position 10 | (3, 15.0) | 45.0 |
| Position 20 | (1, 5.0) | 5.0 |
| Position 50 | (2, 12.0), (1, 9.0) | 33.0 |
| Position 100 | (2, 8.0), (1, 7.0) | 23.0 |

FIG. 5

| | Largest peak (order, power, position, age_factor) | Second largest peak (order, power, position, age_factor) | Third largest peak (order, power, position, age_factor) |
|---|---|---|---|
| First slot peak buffer | (3, 10.0, 2, 1.0) | (2, 8.0, 100, 1.0) | (1, 5.0, 20, 1.0) |
| Second slot peak buffer | (3, 20.0, 2, 0.5) | (2, 12.0, 50, 0.5) | (1, 7.0, 100, 0.5) |
| Third slot peak buffer | (3, 15.0, 10, 0.25) | (2, 10.0, 2, 0.25) | (1, 9.0, 50, 0.25) |

FIG. 6A

| | (order, power, age_factor) information | M = Σ (power × order × age_factor) |
|---|---|---|
| Position 2 | (3, 10.0, 1.0), (3, 20.0, 0.5), (2, 10.0, 0.25) | 65.0 |
| Position 10 | (3, 15.0, 0.25) | 11.25 |
| Position 20 | (1, 5.0, 1.0) | 5.0 |
| Position 50 | (2, 12.0, 0.5), (1, 9.0, 0.25) | 14.25 |
| Position 100 | (2, 8.0, 1.0), (1, 7.0, 0.5) | 19.5 |

FIG. 6B

METHOD FOR ACQUISITION OF SLOT TIMING IN A DIRECT SEQUENCE SPREAD SPECTRUM COMMUNICATION RECEIVER

BACKGROUND OF THE INVENTION

1. Field of the Invention

This invention relates to a direct sequence (DS) spread spectrum (SS) communication receiver, and in particular to a method for acquisition of slot timing during initial cell search synchronization.

2. Description of the Related Arts

When power is applied to a mobile station the task of synchronization with a base station is initiated. This task is called "initial cell search." The characteristics of the Universal Mobile Telecommunications System (UMTS) and the procedure for initial cell search to which the following description relates is described in the European Telecommunications Standards Institute (ETSI) publication TR 101 146 version 3.0.0, "Universal Mobile Telecommunications System, Concept evaluation." As will be clear to those skilled in the art the instant invention is not restricted to use with the UMTS and may also be applied to other WCDMA (wide-band code division multiple access) systems. Reference is made to U.S. Pat. No. 5,982,809 to Liu which forms part of the prior art.

The initial cell search by the mobile station is performed in three steps and the first step is the acquisition of slot synchronization to the transmissions of the base station providing, through a fading path, the strongest signal at the receiver of the mobile station. With reference to FIG. 1 which is a schematic illustration of base station broadcast transmissions, base station transmissions are represented at 1, the transmission channel at 2, and the mobile station receiver at 3. In FIG. 1, by way of example, the transmissions from only two base stations BTS1 and BTS2 are shown.

These base station transmissions are not synchronized with each other and are maintained to transmit over common fixed duration time intervals referred to as slots and common fixed duration framing intervals referred to as frames. One frame comprises 15 slots. In FIG. 1, the start of a slot for the transmissions from base station BTS2 is shown delayed from the start of a slot for the transmissions from base station BTS1 by an arbitrary amount 't' seconds.

The base station transmissions include a synchronization channel (SCH) aligned with the slot boundary and a primary common control physical channel (PCCPCH). The synchronization channel comprises a primary synchronization code (PSC) and a secondary synchronization code (SSC) as illustrated in FIG. 2. In FIG. 2, the primary synchronization code for each slot is represented as $C_p$, the secondary synchronization codes for respective slots are represented as $C_s^{i,0}$ to $C_s^{i,14}$. The code transmitted as the primary synchronization code ($C_p$) is repeated at the beginning of each slot by all base stations.

The BTS transmissions to the receiver 3 will be affected by channel 2. In FIG. 1, the transmissions of base station BTS2 are illustrated as received through a 3-path (multipath) channel 22 while the transmissions of base station BTS1 are illustrated as received through a 2-path channel 21. The signals from base stations BTS1 and BTS2 are effectively summed in channel 2 before arriving at receiver 3 as represented by "Σ" in FIG. 1. Correlation of the received signal with the expected primary synchronization code which is stored in the receiver provides a number of correlation peaks. The peaks are detected by, for example, PAC matched filter 31. The highest peak detected corresponds to that base station of the network (the found base station) to which the receiver will synchronize.

The second step of initial cell search establishes frame synchronization and identifies the code group of the base station found in the first step. The third step of initial cell search determines the scrambling code assigned to the found base station.

A correlation process is performed sample-by-sample and over one slot. The number of shifts of the input data used is the product of the number of chips per slot and the oversampling rate (OSR). The results of the correlation process are averaged over a number of slots and the position of the sample with highest correlation power is selected as the slot boundary. The number of slots used in the averaging process is referred to as the averaging depth.

It is possible also to select and store the positions of the largest peaks from the number of peaks found in the first step. This information can then be used for the remaining two steps to determine the best slot-timing when one detected peak is selected but does not provide satisfactory results in the second and/or the third steps. In such a case, other peaks detected in the first step may be selected and used in the second and third steps.

Pipelining methods are known whereby different cell search steps operate on different parts of the received data (input blocks). The sizes of the input buffer required depends upon the averaging depth of the individual steps. For an averaging depth of one frame per step, the required buffer size is equal to one frame of data.

The provision of some sort of memory storage is germane to the cell search process. Satisfactory performance of the second and third steps depends upon satisfactory performance previously of the first and second steps. When using the same (or part of the same) data portion with all three steps and if averaging is applied to various steps the required memory size increases. Application of averaging to the first step is necessary due to the variations in channel conditions. In order to obtain a reliable slot-timing approximation, it would usually be necessary to implement averaging over a number of slots. Averaging may also be applied (over a number of frames) to the second and third steps.

To obtain the slot-timing, the minimum required input data length for the first step, corresponding to correlation of a single slot with the primary synchronization code (PSC) is [(CHIPS_PER_SLOT+CHIPS_PER_SYMBOL) ×OSR−1]. The number of chips per time slot is expressed as CHIPS_PER_SLOT and the number of chips per symbol as CHIPS_PER_SYMBOL. As synchronization for the second step is based on a codeword which is transmitted over one frame, one frame of input data samples for the second step is envisaged. Similarly one frame of input data samples for the third step would accommodate the periodic transmission of the scrambling codes.

With all three steps operating on the same data block and assuming an averaging depth of 15 slots (i.e. 1 frame) for the first step, an input data buffer for the cell search process will need to store (38656×OSR−1) complex samples. For an OSR of 4 and using 8 bits per I (in-phase) and 8 bits per Q (quadrature) component of each input sample, the required buffer size will be found as 309246 bytes. The memory size would of course increase further if averaging depths of more than 1 frame were applied to second and/or third steps. A buffer size sufficient to accommodate at least 2 frames of data, i.e. 614400 bytes would be more likely.

SUMMARY OF THE INVENTION

It is an object of the invention to provide efficient methods for implementing initial cell search in a WCDMA system which reduce significantly the size of input buffers.

According to the invention there is provided a method of acquiring slot timing when synchronizing a direct sequence spread spectrum communications receiver with transmissions of a network base station, the method comprising the steps of: repetitively correlating a synchronization code received over a radio channel with a synchronization code stored in the receiver; assigning, at each repetitive correlation, a value to resulting peaks; ranking the resulting peaks according to the assigned values; and selecting peaks with highest ranking for slot timing.

The above and other objects, features, and advantages of the present invention will become apparent from the following description with reference to the accompanying drawings which illustrate examples of the present invention.

BRIEF DESCRIPTION OF THE DRAWINGS

FIG. 4 is an example of peak buffer content;

FIG. 5 shows information in the peak buffer shown in FIG. 4 which is rearranged according to the peak positions;

FIG. 6A is an example of peak buffer content including age factor; and

FIG. 6B shows information in the peak buffer shown in FIG. 6A which is rearranged according to the peak positions.

DESCRIPTION OF THE PREFERRED EMBODIMENT

The memory requirements for the first step of the cell search process can be reduced significantly if the correlation peaks are selected on slot-by-slot basis rather than after a number of slots. The need to obtain an average over a number of slots when selecting the correlation peaks remains, however and must be reconciled in any method to be implemented. The method described herein satisfies the requirement for averaging whilst reducing significantly the amount of memory required.

Figure 1:
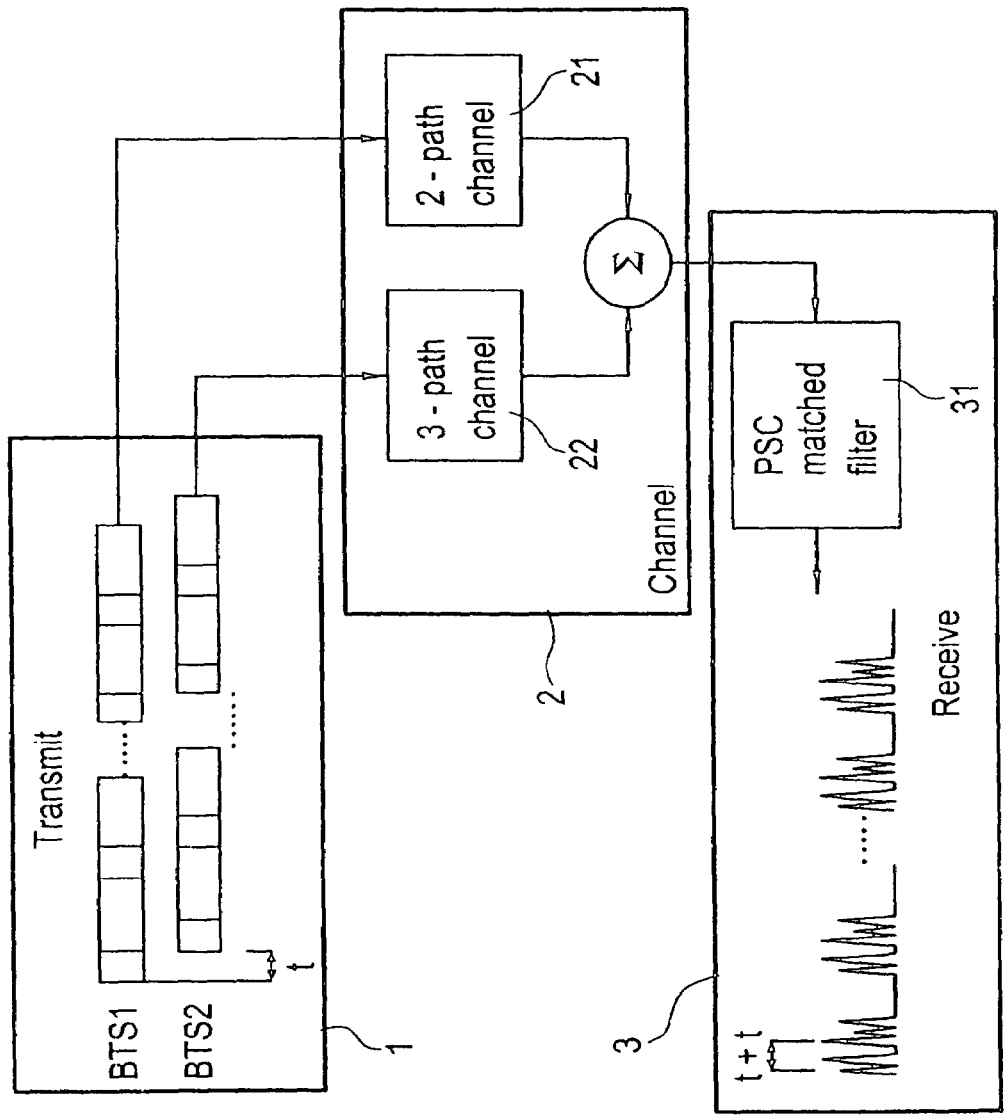
FIG. 1 is a schematic illustration of base station transmissions.
Figure 2:
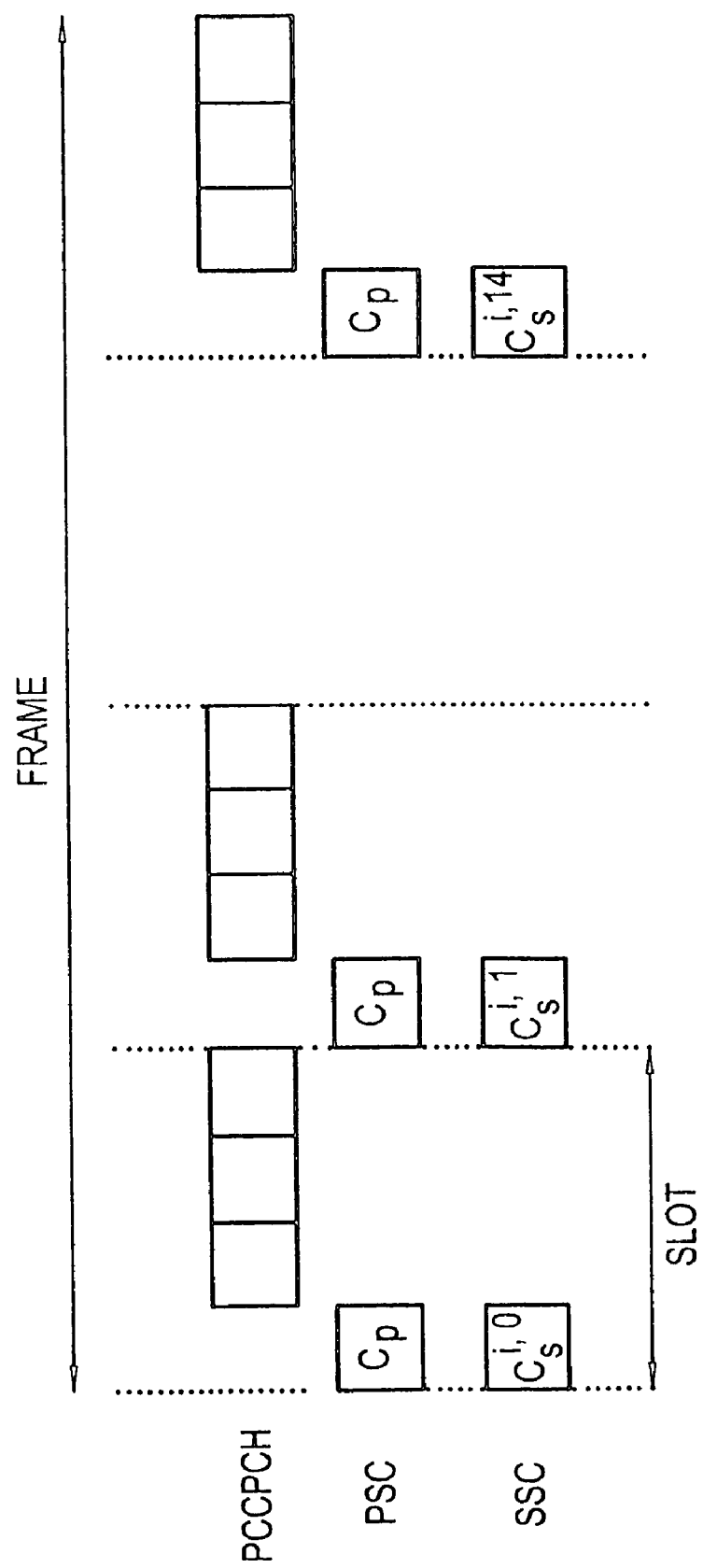
FIG. 2 illustrates the composition of base station transmissions.
Figure 3:
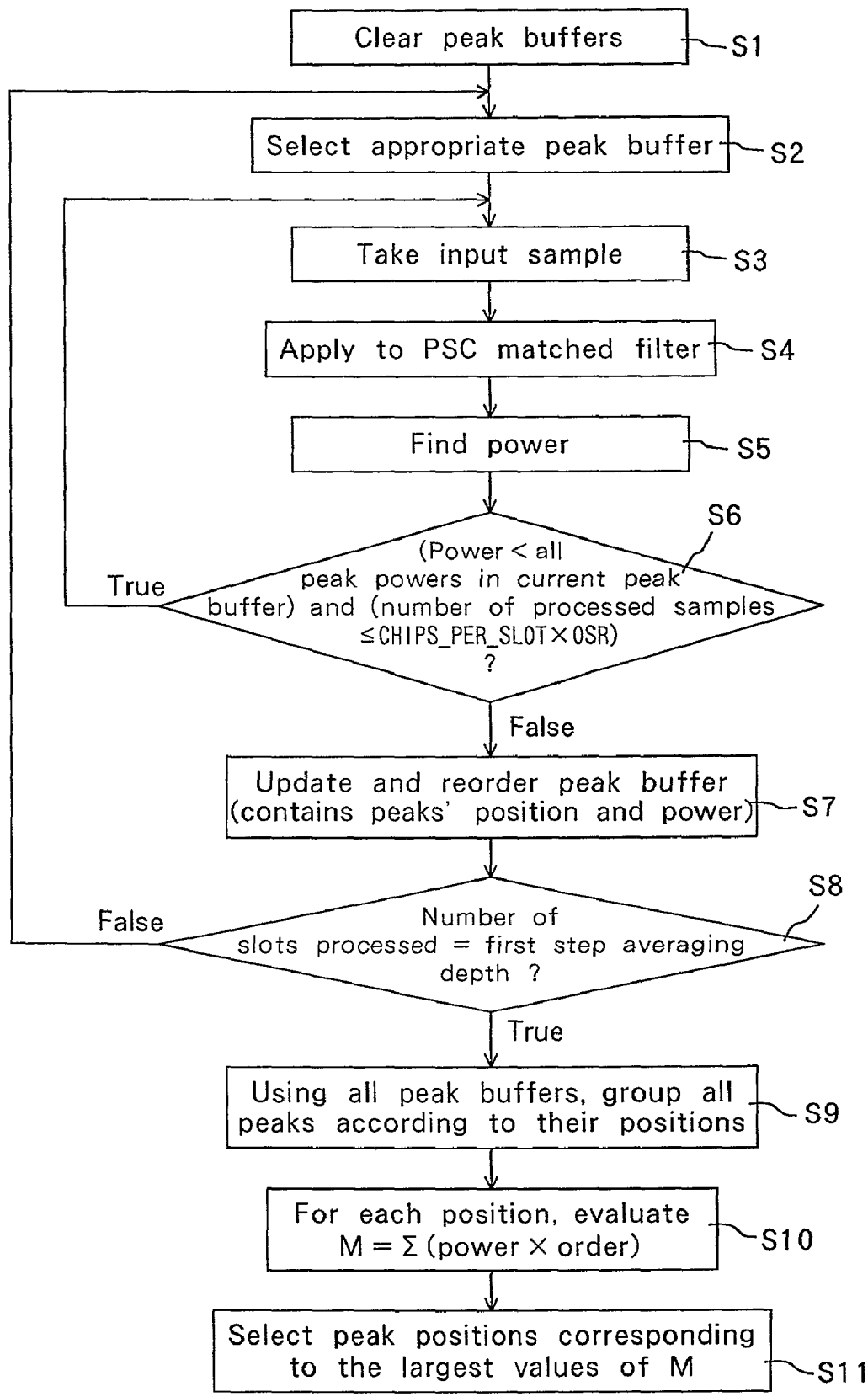
FIG. 3 is a flow chart illustrating the method of slot synchronization according to a preferred embodiment of the present invention.

Further details will be given with reference to FIG. 3 where a flow chart descriptive of the method of the present invention is shown. The primary synchronization code (PSC) data received in the first slot is correlated with the PSC stored in the receiver and the maximum peaks arising from the correlation are selected and saved in a buffer (i.e., a peak buffer). The maximum peaks arising from the correlations with successive slots are found also and saved in separate peak buffers in a similar manner. The number of peak buffers used is equal to the averaging depth for the first step.

The information saved in each peak buffer, in respect of each peak resulting from a correlation is a value comprising a set of numbers. One number in the set of numbers is assigned as the order of the peak. The highest peak saved to a peak buffer is assigned the highest order, the second highest peak is assigned the second highest order et seq. The weakest element of each buffer is assigned the lowest order 1.

One number in the set of numbers is assigned as the power of the peak. This is derived by the addition of the squared correlation result obtained for the I (in-phase) component to the squared correlation result obtained for the Q (quadrature) component. One number in the set of numbers is the position of the peak within the slot, which is the position [modulo (CHIPS_PER_SLOT×OSR)+1] of the input data with which the primary synchronization code is aligned for the correlation generating that peak. For each received slot, the alignment with the first received sample corresponds to position 1 and the alignment with the last sample of the slot is position CHIPS_PER_SLOT×OSR.

With reference to FIGS. 4 and 5, when all of the peak buffers have been filled, the saved information corresponding to the peaks is re-arranged in accordance with the positions of the peaks. A parameter, which we shall call M, is computed for each position. The value of M for any position depends upon the order and the power of the peak at that position such that $M = \Sigma(\text{power} \times \text{order})$. The peaks corresponding to the largest values of M are selected as the output of the first step. The example given in FIGS. 4 and 5 has the number of peaks detected in the correlation as 3 and the averaging depth of the first step is 3. The contents of the three peak buffers are shown in FIG. 4.

The data saved in the three peak buffers are re-arranged in accordance with the position of each peak. It will be seen from FIG. 5 that the positions corresponding to the three largest values of M are positions 2, 10 and 50. These positions are returned as the output of the first step. The age of each peak buffer may also to be taken into account when the parameter M is computed. An additional weighting factor decreasing with the age of each buffer may be included when the parameter M is determined. With the inclusion of the additional weighting factor (age_factor) the parameter M will be obtained as $M = \Sigma(\text{power} \times \text{order} \times \text{age\_factor})$.

With reference to FIGS. 6A and 6B an example is shown for obtaining a value of parameter M when the age factor is taken into account. In this example the age factor assigned to the first peak buffer is unity, for the second peak buffer 0.5 and for the third peak buffer 0.25.

Detailed procedures shown in FIG. 3 will be described.

First, the content of each peak buffer is cleared in Step S1, an appropriate peak buffer is selected in Step S2, and an input sample is taken in Step S3. The PSC matched filter is then applied to the input sample to detect peaks in Step S4 and the power of each detected peak is found in Step S5.

Next, it is determined whether condition that the detected power is smaller than all peak powers in the current peak buffer and the number of processed sample is equal to or less than CHIPS_PER_SLOT×OSR stands or not. If the condition is satisfied, the control goes back to Step S3 to process the next sample. If the condition is not satisfied, then the content of the peak buffer containing the peak positions and peak power is updated and re-ordered in Step S7.

After the processing in Step S7, it is determined in Step S8 whether the number of the processed slots is equal to the averaging depth of the first step or not. If not, the control goes back to Step S2. If the condition of Step S8 is satisfied, then using all peak buffers, all peaks are grouped according to their positions in Step S9, aforementioned parameter $M = \Sigma(\text{power} \times \text{order})$ is evaluated for each position in Step S10, and peak positions corresponding to the largest values of parameter M are selected as slot timing in Step S11.

The slot timing is acquired through the above series of procedure.

Although with these methods, the buffer size depends on the number of desired peaks and the averaging depth used, it will be significantly less than is required for existing prior art methods.

While preferred embodiments of the present invention have been described using specific terms, such description is for illustrative purposes only, and it is to be understood that changes and variations may be made without departing from the spirit or scope of the following claims.

What is claimed is:

1. A method of acquiring slot timing when synchronizing a direct sequence spread spectrum communications receiver with transmissions of a network base station, the method comprising the steps of:
   repetitively correlating a synchronization code received over a radio channel with a synchronization code stored in the receiver;
   assigning, at each repetitive correlation, a value to resulting peaks;
   ranking the resulting peaks according to the assigned values; and
   selecting peaks with highest ranking for slot timing,
   wherein a ranking parameter is computed from a subset of the assigned values; and
   wherein the ranking parameter is computed as a sum of a product of the assigned values for power and for order.

2. A method according to claim 1, wherein said assigned value is assigned as a set of numbers and each number in the set of numbers corresponds to a measured parameter of the resulting peaks.

3. A method according to claim 2, wherein one number in the set of numbers corresponds to power of a resulting peak.

4. A method according to claim 2, wherein one number in the set of numbers corresponds to a position of a resulting peak.

5. A method according to claim 3, wherein one number in the set of numbers corresponds to a position of a resulting peak.

6. A method according to claim 2, wherein one number in the set of numbers corresponds to an order of a resulting peak.

7. A method according to claim 3, wherein one number in the set of numbers corresponds to an order of a resulting peak.

8. A method according to claim 4, wherein one number in the set of numbers corresponds to an order of a resulting peak.

9. A method according to claim 5, wherein one number in the set of numbers corresponds to an order of a resulting peak.

10. A method according to claim 2, wherein a ranking parameter is computed from a subset of the assigned values.

11. A method of acquiring slot timing when synchronizing a direct sequence spread spectrum communications receiver with transmissions of a network base station, the method comprising the steps of:
    repetitively correlating a synchronization code received over a radio channel with a synchronization code stored in the receiver;
    assigning, at each repetitive correlation, a value to resulting peaks;
    ranking the resulting peaks according to the assigned values; and
    selecting peaks with highest ranking for slot timing,
    wherein a ranking parameter is computed from a subset of the assigned values;
    wherein said assigned value is assigned as a set of numbers and each number in the set of numbers corresponds to a measured parameter of the resulting peaks; and
    wherein the ranking parameter is computed as a sum of a product of the assigned values for power and for order.

12. A method according to claim 1, wherein a ranking parameter is derived from a subset of the assigned values and an additional factor.

13. A method according to claim 2, wherein a ranking parameter is derived from a subset of the assigned values and an additional factor.

14. A method according to claim 3, wherein the ranking parameter is derived from a subset of the assigned values and an additional factor.

15. A method according to claim 10, wherein the ranking parameter is derived from a subset of the assigned values and an additional factor.

16. A method according to claim 12, wherein the additional factor is age.

17. A method according to claim 13, wherein the additional factor is age.

18. A method of acquiring slot timing when synchronizing a direct sequence spread spectrum communications receiver with transmissions of a network base station, the method comprising the steps of:
    repetitively correlating a synchronization code received over a radio channel with a synchronization code stored in the receiver;
    assigning, at each repetitive correlation, a value to resulting peaks;
    ranking the resulting peaks according to the assigned values; and
    selecting peaks with highest ranking for slot timing,
    wherein a ranking parameter is derived from a subset of the assigned values and an additional factor; and
    wherein the ranking parameter is computed as a sum of a product of the assigned values for power, the assigned values for order and the additional factor for age.

19. A method of acquiring slot timing when synchronizing a direct sequence spread spectrum communications receiver with transmissions of a network base station, the method comprising the steps of:
    repetitively correlating a synchronization code received over a radio channel with a synchronization code stored in the receiver;
    assigning, at each repetitive correlation, a value to resulting peaks;
    ranking the resulting peaks according to the assigned values; and
    selecting peaks with highest ranking for slot timing,
    wherein said assigned value is assigned as a set of numbers and each number in the set of numbers corresponds to a measured parameter of the resulting peaks;
    wherein a ranking parameter is derived from a subset of the assigned values and an additional factor; and
    wherein the ranking parameter is computed as a sum of a product of the assigned values for power, the assigned values for order and the additional factor for age.

* * * * *